United States Patent

Armin et al.

[11] 4,037,999
[45] July 26, 1977

[54] LIQUID-COOLED ROTARY PISTON INTERNAL COMBUSTION ENGINE WITH HOUSING

[75] Inventors: Bauder Armin; Lechler Rolf, both of Neckarsulm; Steinwart Johannes, Obersulm-Willsbach; Wilmers Gottlieb, Neuenstadt, all of Germany

[73] Assignee: Audi NSU Auto Union Aktiengesellschaft, Neckarslum,Wurrt, Germany

[21] Appl. No.: 666,404

[22] Filed: Mar. 12, 1976

[30] Foreign Application Priority Data

Mar. 15, 1975 Germany .............................. 2511451

[51] Int. Cl.² .............................................. F01C 21/06
[52] U.S. Cl. ........................................ 418/84; 418/88; 418/91; 123/8.01
[58] Field of Search ........................ 418/83, 84, 87, 88, 418/91, 94; 123/8.01

[56] References Cited

U.S. PATENT DOCUMENTS

| 3,298,330 | 1/1967 | Ito et al. | 418/83 X |
| 3,313,276 | 4/1967 | Ito et al. | 418/83 X |
| 3,921,593 | 11/1975 | Lamm | 418/83 X |
| 3,942,917 | 3/1976 | Wieland | 418/83 X |
| 3,947,159 | 3/1976 | Mylenek | 418/83 X |

Primary Examiner—Carlton R. Croyle
Assistant Examiner—Leonard Smith
Attorney, Agent, or Firm—Kane, Dalsimer, Kane, Sullivan & Kurucz

[57] ABSTRACT

Liquid-cooled rotary piston internal combustion engine with a housing consisting of at least one annular shell with interior guideway and two parallel end pieces, and bounding an interior space. The shell and end pieces containing cavities for circulation of two cooling circuits completely separate from each other. One of the circuits cools the region of the housing in the hot arc of the shell, where the ignition, expansion and exhaust strokes take place in the interior space. A liquid-cooled piston revolves in the housing. The cooling circuit of the piston and the shell cooling circuit traversing the region of the hot arc are connected in series.

5 Claims, 4 Drawing Figures

LIQUID-COOLED ROTARY PISTON INTERNAL COMBUSTION ENGINE WITH HOUSING

BACKGROUND OF THE INVENTION

The invention relates to a liquid-cooled rotary piston internal combustion engine with a housing consisting of at least one annular shell with an interior guideway and two parallel end pieces and bounding an interior space. The shell and end pieces contain cavities for circulation of two cooling circuits completely separate from each other. One of the circuits cools the region of the housing in the hot arc of the shell where the ignition, expansion and exhaust strokes occur in the interior space. A liquid-cooled piston revolves in the housing.

There is a known rotary piston internal combustion engine of the kind described U.S. Pat. No. 3,921,593 where two separate cooling circuits have different temperature levels and function independantly of each other. The in general differentially heated regions of the engine are bathed with coolant in a manner that a substantially uniform heating of the housing can be achieved. The housing regions not cooled by cooling from these two circuits are cooled by the lubricant leaving the piston. This means in that arrangement that there is still another coolant circuit affecting the operating temperature of the machine. In any consideration of operating temperature, however, especially in the cold start and warm-up phase, the piston temperature also plays a very important part, as fuel consumption and engine wear will depend on it to a considerable extent. After a cold start, even the aforementioned division of the coolant flow into two independent cooling circuits cannot of itself result in any very rapid heating of the coolant. The comparatively cold lubricant introduced into the liquid-cooled piston and constituting the additional third circuit will retard a rapid rise in operating temperature owing to the comparatively large heat-transfer surface of the piston and the long lubricant heating time required on that account.

SUMMARY OF THE INVENTION

The object of the invention is to provide a liquid-cooled rotary piston internal combustion engine of the kind initially mentioned in which the coolant traversing the piston is heated with comparative rapidity.

This object is accomplished, according to the invention, in that the piston cooling circuit and the shell cooling circuit traversing the hot arc region are connected in series.

Through this arrangement, the coolant leaving the piston can then be heated in that region of the shell which is subjected to the greatest heating by the combustion cycle. The coolant heated in this way then passes through the circuit again and back to the piston. In a cold start, therefore, a rapid elevation of the piston temperature and of the temperature level of the engine as a whole can be obtained, whereas in idling or partial load, a drop in piston temperature can be prevented, as may be advantageous in terms of fuel consumption, reduced wear and rapid diminution of the high power losses due to friction when the engine is cold. Furthermore, the combination of the two cooling circuits, that of the piston and that of the hot arc of the shell, results in a simplification compared to the known arrangement.

In a rotary piston internal combustion engine having a housing of trochoid type, in which the major axis of the housing is perpendicular and the hot arc of the shell is downward, the shell cavity located in the region of the hot arc traversed by coolant may be in communication with an outlet arranged above the highest point of the outer peripheral wall of the shell guideway in part bounding said cavity. This arrangement serves to ensure that the coolant leaving the piston, not under pressure, and entering the cavity of the hot arc of the shell, will be carried all the way along the outer peripheral wall of the guideway, thereby avoiding any local overheating of the guideway and preventing possible warping of the shell. At the same time, the flow cross section of this cavity in the hot arc is chosen such that the entering flow of coolant will not stagnate or collect, but pass right through. The drain may be arranged either in the shell itself or in one or both of the adjoining end pieces.

With the proposal according to the invention, where the coolant traversing the piston is carried off by way of passages in at least one end piece, the shell cavity located in the hot region may be connected firstly to the passages in the end piece and secondly to the suction side of a pump by way of a line capable of being connected to an oil sump at a coolant temperature above a certain reading. Through this arrangement, use may be made of a coolant that will at the same time serve to lubricate the moving parts and bearing surfaces inside the engine and be collected in the oil sump. But also, in this arrangement, the coolant and/or lubricant leaving the piston and traversing the passages in the end piece and shell when the engine is cold can be returned immediately to the pump, without reaching the sump and being mixed with comparatively cooler coolant. The thus modified flow of coolant and lubricant in circulation can therefore be heated very rapidly in the hot arc of the shell, contributing to a rapid reduction of frictional power losses after a cold start. As the temperature of the engine rises, this hot coolant and lubricant — for example in response to a temperature sensor — may be mixed with cooler lubricant from the oil sump to achieve an appropriate temperature level.

To avoid any injurious over heating in the hot arc of the shell during operation of the engine, it is proposed further that a by-pass line connected to the pressure side of the pump and carrying excess coolant shall open into the cavity arranged in the hot arc region. Through this arrangement, at high load and high speed, resulting in an elevation of shell temperature in the hot arc especially, during which conditions the flow of coolant and/or lubricant delivered by the pump exceeds the demand, the excess coolant can be supplied to the cooling circuit by way of the usual by-pass line, in which an excess pressure valve will release lubricant at a certain pressure, so that a more uniform temperature level may be established.

Embodiments of the invention in the form of a housing of a double rotary piston internal combustion engine of trochoid type will now be described by way of example with reference to the drawings, in which:

DESCRIPTION OF THE PREFERRED EMBODIMENTS

Figure 1:
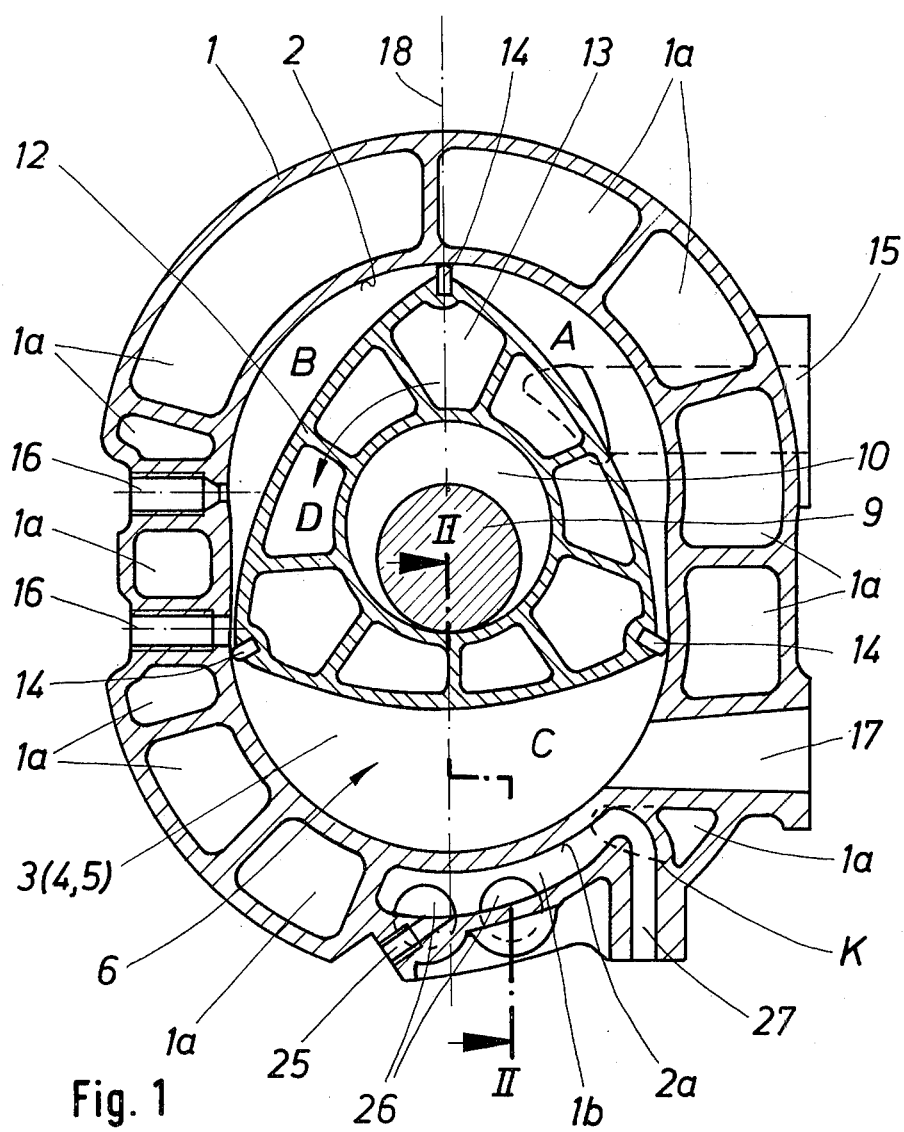
FIG. 1 shows a cross section of one shell of the housing with piston.
Figure 2:
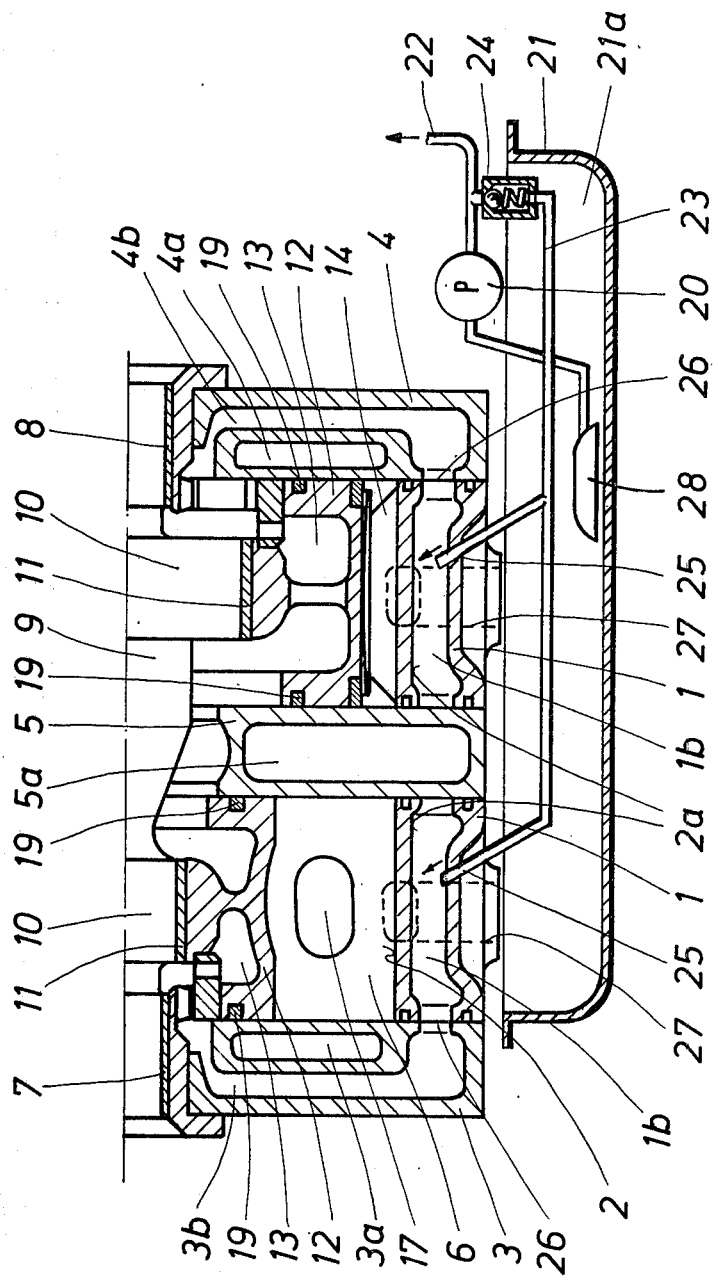
FIG. 2 shows a longitudinal section of the housing at the line II—II in FIG. 1, limited to the lower half, in part schematically.

Reference is made first to FIGS. 1 and 2, in which the illustrated housing of a rotary piston engine of trochoid type consists of liquid-cooled shell units 1 having an interior guideway 2, two parallel end pieces 3 and 4 and a middle piece 5, and encloses two interior spaces 6 traversed by an eccentric shaft 9 having two eccentrics 10 and mounted in bearings 7 and 8 in end pieces 3 and 4 and passing through the middle piece 5. On a piston bearing 11 on each eccentric 10 is rotatably mounted a liquid-cooled polygonal piston 12 with inner cavities 13 through which coolant flows. The piston 12 is provided at its vertices with sealing members 14 continuously sliding along the interior guideway 2 as the piston 12 revolves in the direction of rotation D, forming three working chambers A, B and C of variable volume, in each of which a complete four-stroke cycle is carried out with a corresponding shift in phase. For this purpose, an inlet passage 15 to supply fresh gas, two spark plug emplacements 16 and an outlet passage 17 for exhausting burned gases are provided. In the position of piston 12 as shown, chamber A is in intake, chamber B is in compression and chamber C is in exhaust. The housing is so arranged that the major axis 18 of the trochoidal shell guideway 2 is perpendicular and the hot arc of the jacket 1, where the combustion and exhaust strokes occur as represented in FIG. 1, is downward. To avoid leakage of coolant or lubricant from the piston cavity 13 into the working chambers A, B, C of the interior space 6, an axially movable sealing ring 19 acting between piston 12 and the neighboring walls of end pieces 3 and 4 and middle piece 5 is provided in each face of each piston 12.

The shell 1, end pieces 3 and 4 and middle piece 5 contain cavities for the circulation of two cooling circuits completely separate from each other. The first cooling circuit traverses cavities 1a in shell 1, 3a and 4a in end pieces 3 and 4, and 5a in middle piece 5, while the cooling circuit of piston 12, in series with that of shell 1 and traversing the region of the hot arc, comprises the second cooling circuit, passing through cavity 1b in shell 1, and passages 3b and 4b in end pieces 3 and 4. Cavity 1b of shell 1 extends over a part of the region of the hot arc, in which the combustion and exhaust strokes take place, while the cavities 1a in this embodiment, as illustrated in FIG. 1, taken in the direction of rotation, extend from outlet duct 17 by way of chambers A and B and the ignition region as far as chamber C, in each instance adjacent to the cavity 1b. For dependable and uniform heat transfer in the region of the outlet duct 17, the drain 27 is embraced on either side by said cavities 1a where it adjoins them, as indicated by the dotted line K in FIG. 1.

The second cooling circuit is supplied with coolant by the coolant and lubricant circuit provided to lubricate bearings 7 and 8 and piston bearing 11 and to cool the piston 12, having a pump 20 taking in the coolant-lubricant through a screen 28 from tank 21 and delivering it to bearings 7, 8, 11 by way of line 22 and passages not shown. From line 22 branches off a conventional by-pass line 23 having a spring-loaded excess-pressure valve that opens in response to elevated coolant pressure and, according to the invention, delivers excess coolant by way of the by-pass line 23 and openings 25 in shell 1 additionally into the cavities 1b of the second cooling circuit.

In operation of the engine, the coolant and lubricant leaving bearings 7 and 8 and piston bearings 11 enters the cavities 13 of pistons 12 and then passes pressureless by way of passages 3b and 4b of end pieces 3 and 4 and openings 26 into cavity 1b of shell 1. The drain 27 through which the coolant-lubricant or cooling liquid can flow off from cavity 1b into tank 21 is arranged above the highest point of the outer peripheral wall 2a of the guideway 2, bounding the cavity 1b on the side towards the interior space 6. This positively compels the coolant to flow along the peripheral wall 2a, and thus ensures reliable heat transfer from guideway 2 to the coolant before it drains into tank 21. The drain 27 is constructed so that the outer peripheral wall 2a is abundantly bathed with coolant and lubricant over its entire surface adjacent to the guideway 2. From the tank 21, the heated coolant passes through pump 20 and line 22 back to bearings 7, 8 and 11 and into cavities 13 to heat the pistons 12. At higher speeds and load, that is, when the pump 20 is delivering a greater flow of coolant and the hot arc in shell 1 is heated intensely, to avoid overheating in this region the coolant and lubricant ordinarily diverted by way of by-pass line 23 is additionally delivered into cavity 1b of the shell.

Figure 3:
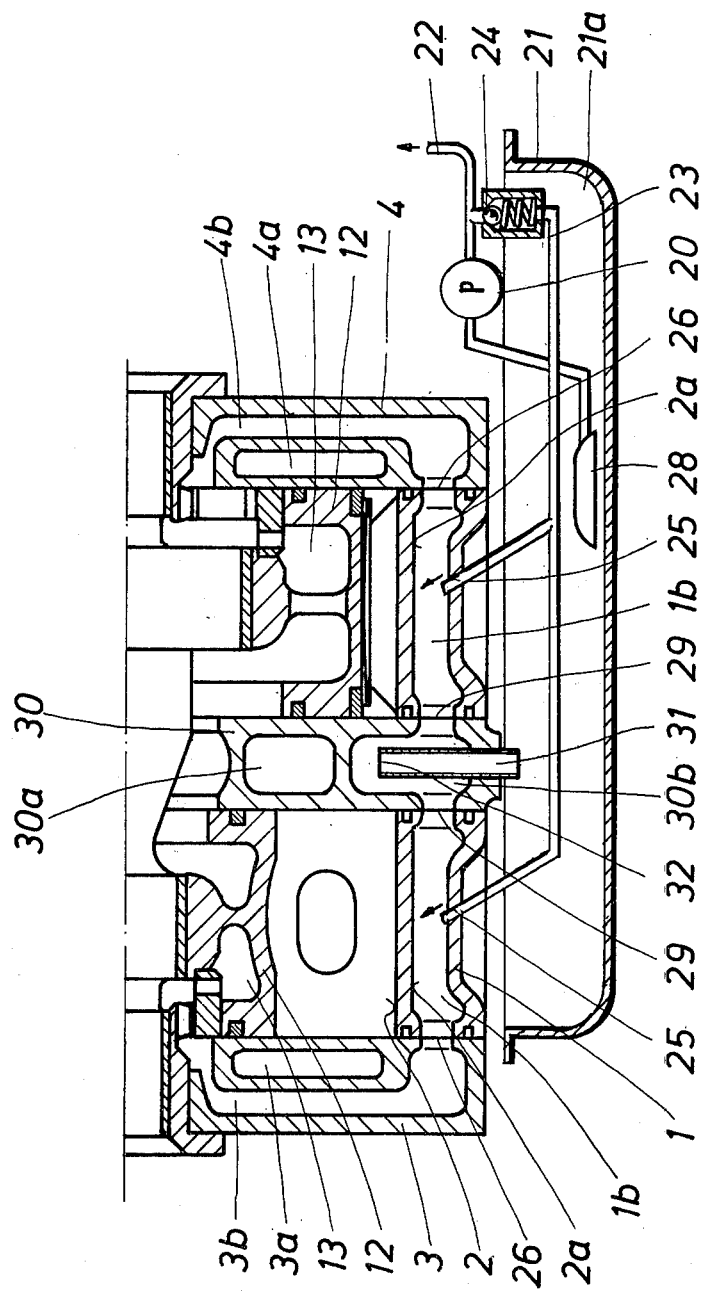
FIG. 3 shows a longitudinal section similar to FIG. 2 of the housing in a second embodiment.

As shown in FIG. 3, in which the same reference numerals as in FIGS. 1 and 2 have been used for the same or similar parts, and in departure from the foregoing, there is a possible embodiment of a multiple engine in which the cavities 1b *communicate at their highest point in shell 1 by way of openings 29 with a cavity 30b* in the middle piece 30, while the cavity 30a in the middle piece 30 is connected with the cavities 3a and 4a of the other cooling circuit. The cavity 30b has a drain pipe 31 the top 32 of which is higher than the highest point of cavity 1b in shell 1 or of the openings 29. The coolant and lubricant entering cavities 3b, 4b and 1b from piston 12 can drain into tank 21 in this arrangement only when it has risen to the top 32 of drain pipe 31 in cavity 30b, so that a complete bathing of the peripheral wall 2a of the guideway 2 in shells 1 is assured.

Figure 4:
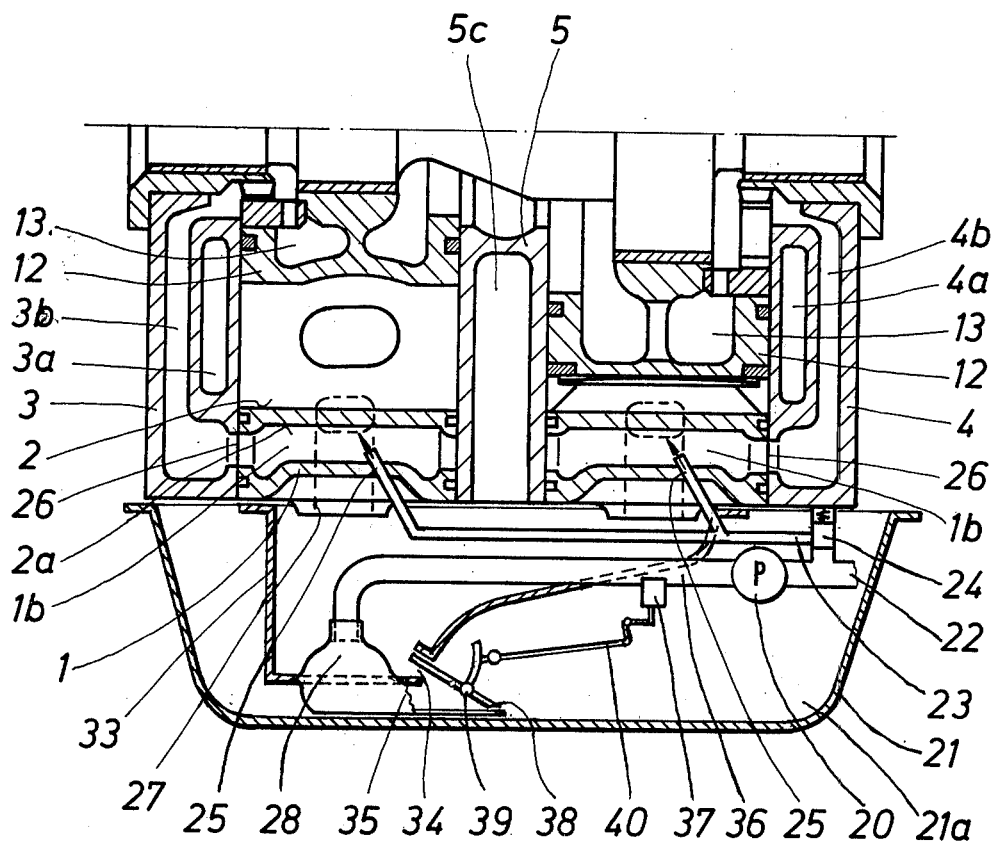
FIG. 4 shows a longitudinal section similar to FIG. 2 of the housing in a third embodiment.

In the embodiment shown by way of example in FIG. 4, the same reference numerals as in FIG. 2 have been used for the same or similar parts. In departure from the embodiment of FIG. 2, the middle piece 5 is shown sectioned in that region where the vent of tank 21, generally connected in known manner with an oil supply pipe or aspiration, is arranged, forming a cavity 5c in a comparatively cold region of the middle piece 5. Also, in contrast to the embodiments of FIGS. 2 and 3, the drains 27 open into a small catch basin 33 arranged inside tank 21. With engine cold, and in the warm-up phase, the catch basin 33 communicate directly with the screen 28 of pump 20 by way of a drain 34 and a line or suction connection 35. In this way, the coolant and lubricant leaving the piston 12 can be conveyed by way of cavities 3b, 4b, and 1b by the shortest path directly back into the lubricant circuit, so that the thus reduced flow of lubricant will heat up very quickly. On the suction line 36 between intake screen 28 and pump 20, a temperature sensor 37 is provided, responding to the temperature of the coolant and lubricant taken in. With rising temperature, the temperature sensor 37 acts by way of a linkage 40 on a flap valve 38 pivoted on a shaft 39 and arranged at the drain 34, whereby firstly the communication of the drain 34 with the suction line 36 is reduced, and secondly a contrariwise enlarging connection is established between suction line 35 with oil sump 21a of tank 21. By this arrangement, depending on the temperature level of the lubricant, cooler coolant and lubricant from the oil sump 21a of tank 21 is mixed with the lubricant in circulation. Despite a more rapid heating of the lubricant and more rapid attainment of an economic temperature level of piston 21, therefore, no overheating of the engine can occur.

In a single rotary piston internal combustion engine, consisting of one shell 1 and two parallel end pieces, the drain pipe 31 arranged in the middle piece may be arranged instead in the end piece opposed to the end piece provided with the passage leading to shell 1 for supply of coolant and lubricant.

The invention is not limited only to the embodiments represented by way of example; alternatively, for example, coolant may be supplied to cavity 13 both from the bearings and by way of an additional special injection system.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. Liquid-cooled rotary piston internal combustion engine with a housing consisting of at least one annular shell with interior guideway and two parallel end walls and bounding an interior space, the shell containing first and second cavities for circulation of two separate cooling circuits with said first cavity being arranged in the region of the housing where the expansion and exhaust strokes take place in the interior space, and a liquid-cooled piston revolving in the interior space and having cavities traversed by cooling liquid, the piston cavities and said first cavity being connected in series.

2. Liquid-cooled rotary piston internal combustion engine according to claim 1 comprising a housing of trochoid type wherein the major axis of the housing is vertical and the region of the shell where expansion and exhaust take place is downward, and said first cavity being in communication with a drain arranged above the highest point of the outer peripheral wall, partially bounding said first cavity, of the shell guideway.

3. Liquid-cooled rotary piston internal combustion engine according to claim 1 wherein the cooling liquid traversing said first cavity and said piston cavities has lubricating properties.

4. Liquid-cooled rotary piston internal combustion engine according to claim 1 wherein the piston cavities communicate with passages in at least one end wall and said first cavity communicates on one hand with said passages and on the other hand with the suction side of a coolant pump, and means for connecting said suction side and said first cavity to an oil pan when the coolant temperature exceeds a certain value.

5. Liquid-cooled rotary piston internal combustion engine according to claim 7 wherein a by-pass line communicating with the pressure side of said coolant pump and carrying excess coolant opens into said first cavity.

* * * * *

UNITED STATES PATENT OFFICE
CERTIFICATE OF CORRECTION

PATENT NO. : 4,037,999
DATED : July 26, 1977
INVENTOR(S) : Bauder Armin & Lechler Rolf It is certified that error appears in the above-identified patent and that said Letters Patent are hereby corrected as shown below:

Col. 6, line 27, the number "7" should read -- 4 --.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks